United States Patent
Nemati et al.

(10) Patent No.: US 11,327,155 B2
(45) Date of Patent: May 10, 2022

(54) RADAR SENSOR MISALIGNMENT DETECTION FOR A VEHICLE

(71) Applicant: Robert Bosch GmbH, Stuttgart (DE)

(72) Inventors: Alireza Nemati, Novi, MI (US); Aghapi Mordovanakis, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 16/704,562

(22) Filed: Dec. 5, 2019

(65) Prior Publication Data

US 2020/0200870 A1 Jun. 25, 2020

Related U.S. Application Data

(60) Provisional application No. 62/783,674, filed on Dec. 21, 2018.

(51) Int. Cl.
*G01S 7/40* (2006.01)
*G01S 13/86* (2006.01)
*G01S 13/931* (2020.01)
*G01S 13/00* (2006.01)

(52) U.S. Cl.
CPC ............ *G01S 7/4026* (2013.01); *G01S 13/86* (2013.01); *G01S 13/931* (2013.01); *G01S 7/403* (2021.05)

(58) Field of Classification Search
CPC .......... G01S 7/4026; G01S 7/403; G01S 2013/93272; G01S 13/87; G01S 2013/93271; G01S 7/4091; G01S 13/86; G01S 13/867; G01S 13/931; B60W 30/09
See application file for complete search history.

(56) References Cited

U.S. PATENT DOCUMENTS

| | | | |
|---|---|---|---|
| 4,692,765 A | 9/1987 | Politis et al. | |
| 6,359,586 B1 | 3/2002 | Sviestins | |
| 6,778,928 B2 | 8/2004 | Stiller | |
| 7,012,560 B2 | 3/2006 | Braeuchle et al. | |
| 7,352,292 B2 | 4/2008 | Alter et al. | |
| 7,587,102 B2 | 9/2009 | Maris | |
| 8,589,116 B2* | 11/2013 | Jordan | G01S 7/4026 702/151 |
| 8,604,968 B2 | 12/2013 | Alland et al. | |
| 9,285,190 B1 | 3/2016 | Boardman et al. | |
| 9,449,508 B2 | 9/2016 | Chapman et al. | |
| 9,453,910 B2 | 9/2016 | Elwart et al. | |
| 9,719,801 B1* | 8/2017 | Ferguson | G01S 13/931 |
| 9,927,813 B1 | 3/2018 | Ferguson et al. | |
| 10,553,044 B2* | 2/2020 | Mercep | B60W 30/09 |

(Continued)

FOREIGN PATENT DOCUMENTS

| | | | | |
|---|---|---|---|---|
| JP | 2007-163258 A | * | 6/2007 | ........... G01S 13/931 |
| JP | 2008-215912 A | * | 9/2008 | ........... G01S 13/931 |
| JP | 2010-249613 A | * | 11/2010 | ........... G01S 13/931 |

*Primary Examiner* — Bernarr E Gregory

(74) *Attorney, Agent, or Firm* — David Kovacek; Maginot, Moore & Beck LLP

(57) ABSTRACT

A system and method for detecting a level of misalignment of a vehicle sensor, such as a radar sensor, compared to a reference sensor also associated with the vehicle. The reference sensor may comprise a different type of sensor, such as an optical sensor, motion sensor, or position sensor. One or more reference sensors may be utilized in detecting a level of misalignment.

15 Claims, 4 Drawing Sheets

(56) References Cited

U.S. PATENT DOCUMENTS

| | | | |
|---|---|---|---|
| 2007/0182623 A1* | 8/2007 | Zeng | G01S 7/4026 342/174 |
| 2016/0349356 A1 | 12/2016 | Takaki | |
| 2017/0097413 A1 | 4/2017 | Gillian et al. | |
| 2017/0097684 A1 | 4/2017 | Lien | |
| 2017/0169627 A1 | 6/2017 | Kim et al. | |
| 2017/0278014 A1 | 9/2017 | Lessmann et al. | |
| 2017/0307730 A1* | 10/2017 | Baba | G01S 7/4026 |
| 2018/0233947 A1 | 8/2018 | Nehmadi et al. | |
| 2019/0277946 A1* | 9/2019 | Hodges | G01S 13/931 |

* cited by examiner

RADAR SENSOR MISALIGNMENT DETECTION FOR A VEHICLE

TECHNICAL FIELD

This disclosure relates to the field of sensor alignment and calibration for sensors associated with a vehicle.

BACKGROUND

Radar-based mapping and localization are garnering industry-wide attention due to their potential for providing high-definition (HD), weather-proof maps for highly automated driving. A dense radar map may be useful for accurate localization of a vehicle with radar sensors.

However, radar sensors are prone to misalignment during normal use, due to causes such as vibrations or minor impacts to the vehicle frame. Misaligned radar sensors may be unreliable. Although radar software may allow for misalignment compensation, the detection of misalignment is a useful to provide for realignment procedures. Radar sensors may be currently be calibrated and realigned using procedures typically performed at a dealership or service center. Reliance upon specialized facilities is time consuming and inconvenient for users of the vehicles.

SUMMARY

One aspect of this disclosure is directed to a vehicle sensor system operable comprising a vehicle processor, a radar sensor, at least one reference sensor and a memory. The vehicle processor may be operable to detect a misalignment condition of the radar sensor with respect to the at least one reference sensor. In some embodiments, the at least reference sensor may comprise an optical sensor affiliated with the vehicle or a motion sensor affiliated with the vehicle.

Another aspect of this disclosure is directed to a method of detecting radar sensor misalignment for a radar sensor associated with a vehicle. The method comprises generating sensor data from the radar sensor and at least one reference sensor, and generating alignment status data indicating whether the sensor data matches within a predetermined threshold. The sensor data may be generated using high-density maps comprising expected measurement readings corresponding to the radar sensor and the at least one reference sensor. In some embodiments, the radar sensor may be realigned when the alignment status data indicates a consistent misalignment.

A further aspect of this disclosure is directed to a non-transitory computer-readable medium comprising executable instructions stored thereon that when executed by a processor cause the processor to perform a method for detecting misalignment of a radar sensor associated with a vehicle. The method of the instructions may comprise receiving sensor data from the radar sensor and at least one reference sensor and generating position data based upon the received sensor data. The method may further comprise instructions to generating alignment status data that indicates whether position data matches within a predetermined threshold.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
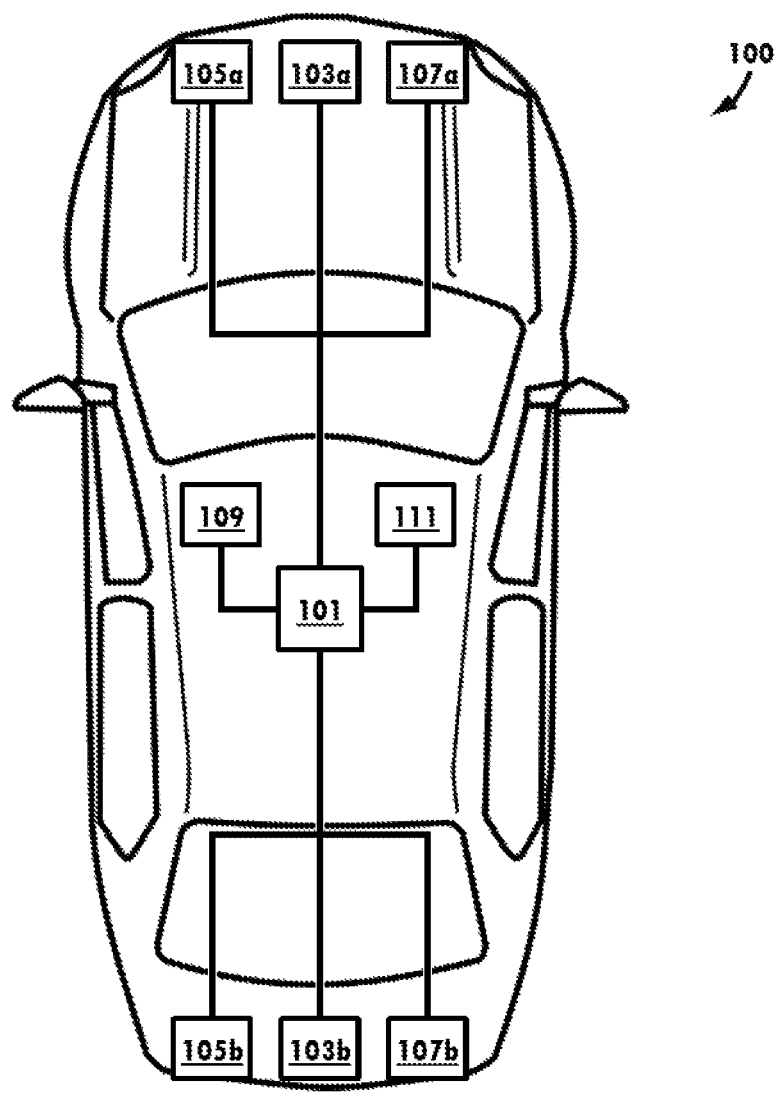
FIG. 1 is a diagrammatic illustration of vehicle having radar sensors and additional sensors that may be used for detection of misalignment in the radar sensor.

FIG. 1 shows a diagrammatic view of a system operable for sensor misalignment detection associated with a vehicle 100. The system comprises a vehicle processor 101 in data communication with a number of radar sensors 103, optical sensors 105, and motion sensors 107 associated with vehicle 100. Each of the sensors may be disposed at least in part within a predetermined distance from the body of the vehicle. In the depicted embodiment, each of the sensors may be disposed within the body of the vehicle. In the depicted embodiment, radar sensor 103a, optical sensor 105a, and motion sensor 107a are disposed near the front of vehicle 100, and radar sensor 103b, optical sensor 105b, and motion sensor 107b are disposed near the rear of vehicle 100, but other embodiments may comprise other configurations without deviating from the teachings disclosed herein. Some embodiments may comprise a different number of one or more of the sensors without deviating from the teachings disclosed herein.

Radar sensors 103 may be operable to measure distances from vehicle 100 to objects or features of the environment. Optical sensors 105 may be operable to capture image data describing the environment around vehicle 100, including objects or features therein. Motion sensors 107 may be operable to detect movement of objects in relation to vehicle 100, or to detect and measure proximity of vehicle 100 to other objects or features of the environment. In some embodiments, motion sensors 107 may be operable to measure the proximity of vehicle 100 to static environmental features, such as the shoulders of a road, barricades, roadside signage, or other known environmental features known to one of ordinary skill in the art without deviating from the teachings disclosed herein.

The system may also comprise a memory 109 associated with vehicle 100 and in data communication with vehicle processor 101. Memory 109 may comprise computer-executable instructions that when executed by vehicle processor 101 cause vehicle processor 101 to perform functions of the system. Memory 109 may further comprise a number of high-density maps. The high-density maps may comprise data reflecting expected measurements of one or more of the sensors within known environments. In the depicted embodiment, memory 109 may comprise a high-density radar-sensor map comprising data indicating expected radar readings for static environmental features. In the depicted embodiment, memory 109 may comprise a high-density image map indicating expected optical readings for static environmental features. Other embodiments may comprise different or additional high-density maps without deviating from the teachings disclosed herein.

Memory 109 may be embodied as a non-transitory computer-readable storage medium or a machine-readable medium for carrying or having computer-executable instructions or data structures stored thereon. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

In the depicted embodiment, the system may also comprise a position sensor 111 in data communication with vehicle processor 101 and operable to generate localization data indicating a position of vehicle 100 with respect to the environment. In the depicted embodiment, position sensor 111 may comprise a sensor compatible to detect Global Navigational Satellite System (GNSS) signals, such as signals used by a Global Positioning System (GPS), but other embodiments may comprise other configurations of a location signal without deviating from the teachings disclosed herein. In some embodiments, the system may comprise multiple position sensors 111 having different configurations without deviating from the teachings disclosed herein. In some embodiments, the system may comprise a plurality of redundant position sensors 111 operable to provide redundant measurements to advantageously improve accuracy (e.g., using triangulation or other multi-sensor methods) without deviating from the teachings disclosed herein. In the depicted embodiment, memory 109 may comprise a high-density position map depicting positional data that indicates the features or conditions of environments in which vehicle 100 may be operated. Some embodiments may comprise different configurations of a high-density position map without deviating from the teachings disclosed herein.

In the depicted embodiment, vehicle processor 101 may be operable to compare the measurements of one or more of radar sensors 103 to the high-density radar map to generate radar-position data indicating a location of vehicle 100. Vehicle processor 101 may further be operable to utilize one or more of optical sensors 105, motion sensors 107, or position sensor 111 as a reference sensor to generate data that may be utilized as reference-position data indicating the location of vehicle 100. The reference-position data may be considered within the context of the sensor or sensors used to generate the reference-position data. For example, optical sensors 105 may generate optical-sensor data used to generate reference-position data when the optical measurements are compared to the high-density image map. Motion sensors 107 may generate motion-sensor data indicating measurements useful for generating reference-position data that indicates the position of vehicle 100 with respect to position of vehicle 100 on a road surface. Position sensor 111 may generate localization data used to generate reference-position data when the localization measurements are compared to high-density position map data.

Different sensors of the system may have advantageous operating strengths in comparison to other sensors of the system. For example, radar sensors 103 may provide better accuracy of measurements than optical sensors 105 in adverse weather conditions such as heavy rain, snow, or fog. In contrast, optical sensors 105 may provide more-accurate measurements in a lateral direction from vehicle 100 than radar sensors 103, making optical sensors 105 very useful for certain types of measurements, such as lane localization measurements. Radar sensors 103 may provide more-accurate measurements in a longitudinal direction from vehicle 100 than optical sensors 105. In some embodiments, the lateral measurements obtained using optical sensors 105 may provide accurate measurements to within ±20 cm, but other embodiments may comprise other tolerances without deviating from the teachings disclosed herein.

The advantageous improved lateral accuracy of optical sensors 105 may provide a useful reference measurement for determining the alignment of radar sensors 103 in a lateral direction. Such measurements may advantageously be used to assess the lateral accuracy of radar sensors 103 for use in lateral measurements to determine relatively precise localization measurements, such as those directed to determining lane placement of vehicle 100 with respect to a road surface.

Figure 2A:
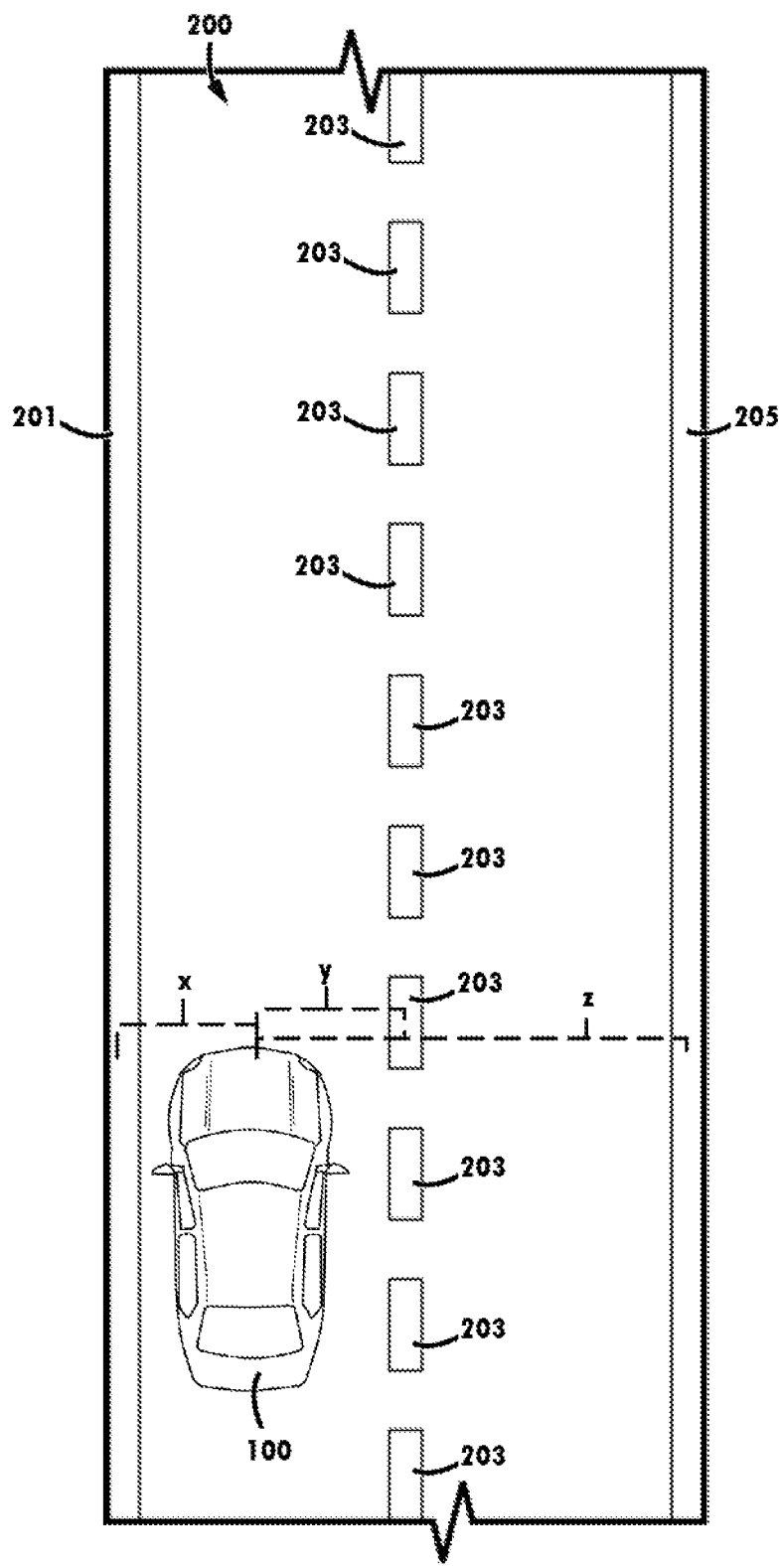
FIG. 2a is a diagrammatic illustration of vehicle in a traffic environment suitable for detecting misalignment of a radar sensor using static environmental features.

FIG. 2a is a diagrammatic illustration of an environment comprising a vehicle 100 (see FIG. 1) on a road 200 and useful measurements that may be utilized to assess the level of misalignment of a sensor, such as a radar sensor 103 (see FIG. 1), in a lateral direction. Radar sensor 103 may be operable to detect boundaries of road 200, but may be compared to measurements of an optical sensor 105 (see FIG. 1) to determine if there is a consistent measurement error of the radar sensor 103. Optical sensor 105 may be utilized by vehicle processor 101 (see FIG. 1) to determine the distances between a fixed point on vehicle 100 with a left shoulder line 201, lane markers 203, or a right shoulder line 205 of road 200. In the depicted embodiment, the fixed point of vehicle 100 is the center of the front of the vehicle, but other embodiments may make use of another or more fixed points without deviating from the teachings disclosed herein. The distance between the fixed point and the left shoulder line 201 is represented in the depicted embodiment as a distance x. The distance between the fixed point and the nearest lane marker 203 is represented in the depicted embodiment as a distance y. The distance between the fixed point and the right shoulder line 205 is represented in the depicted embodiment as a distance z.

In determining whether a radar sensor 103 is laterally misaligned, vehicle processor 101 may take measurements of x, y, and z using both the radar sensor 103 and the optical sensor 105 and compare the measurements obtained from each of the sensors. If the measurements match within a predetermined threshold, it may be understood that radar sensor 103 is not misaligned within specified parameters, and alignment data may be generated indicating radar sensor 103 is not misaligned. If the measurements are different by a value larger than a predetermined threshold, it may be understood that the radar sensor 103 may be misaligned, and alignment data may be generated indicating a misalignment. Repeated or redundant measurements may be utilized to see if consistency is achieved in the measurement differences. If repeated measurement comparisons yield consistent differences above the predetermined threshold, it may be more likely that the radar sensor 103 is misaligned. In some embodiments, vehicle processor 101 may be operable to perform a software realignment of a radar sensor 103 based upon comparison to reference measurements of another sensor associated with vehicle 100.

Figure 2B:
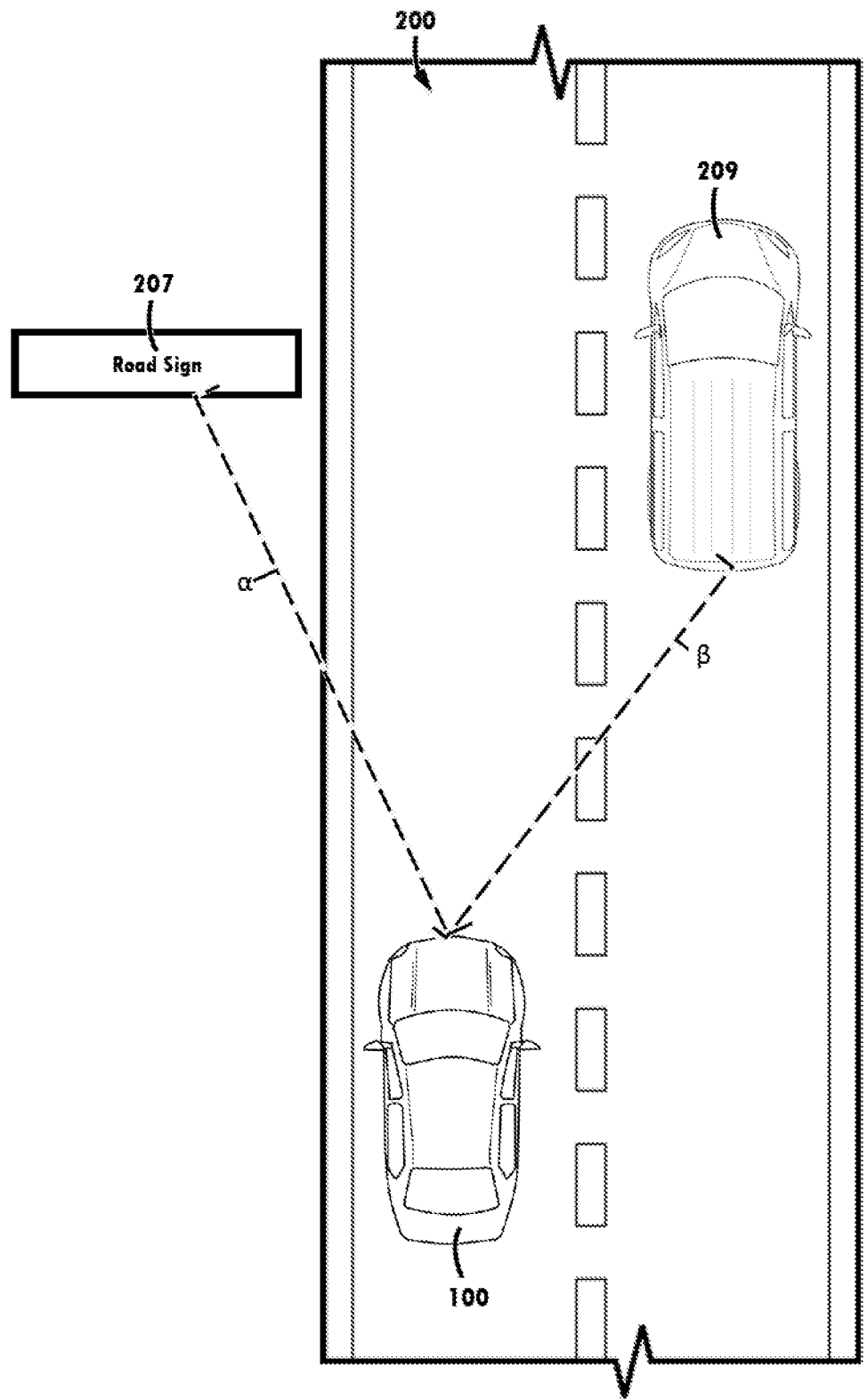
FIG. 2b is a diagrammatic illustration of vehicle in a traffic environment suitable for detecting misalignment of a radar sensor using dynamic environmental features.

In some embodiments, radar sensor 103 may be checked for misalignment in a longitudinal direction from vehicle 100. Because radar sensors are typically accurate to a degree that is comparable or better than an optical sensor, other sensor types may be utilized to check for misalignment in a longitudinal direction. FIG. 2b is a diagrammatic illustration of an environment comprising a vehicle 100 (see FIG. 1) on a road 200 (see FIG. 2) and useful measurements that may be utilized to assess the level of misalignment of a sensor, such as radar sensor 103 (see FIG. 1), in a longitudinal direction. Vehicle 100 may utilize reference sensors other than optical sensors 105 (see FIG. 1) which are known to be comparably or more accurate than radar sensors 103 in a longitudinal direction. In the depicted embodiment, a motion sensor 107 (see FIG. 1) may be utilized to make longitudinal measurements. Motion sensors may advantageously provide comparably or more accurate measurements compared to radar sensors in a longitudinal direction, and may be known to be highly accurate at relatively short distances, such as less than 4 m.

Longitudinal measurements may advantageously be made between a fixed point on vehicle 100 and an object within the environment disposed at least partially longitudinally from vehicle 100. Objects within the environment may be static or in active motion without deviating from the teachings disclosed herein. In the depicted embodiment, the environment comprises a static object in the form of a road sign 207, but other static objects may comprise road barricades, traffic barrels, bridge overpasses, trees, light posts, or any other static environmental feature recognized by one of ordinary skill in the art without deviating from the teachings disclosed herein.

In the depicted embodiment, the environment comprises a moving object in the form of an other vehicle 209, but other moving objects may comprise pedestrians, moving traffic barricades, bicycles, or any other moving environmental feature recognized by one of ordinary skill in the art without deviating from the teachings disclosed herein.

In determining whether a radar sensor 103 is longitudinally misaligned, vehicle processor 101 (see FIG. 1) may take measurements made by radar sensor 103 and a reference sensor such as motion sensor 107 from a fixed point on the vehicle to a fixed point on an environmental feature. In the depicted embodiment, the fixed point on the vehicle comprises the center of the front of vehicle 100, but other embodiments may comprise other configurations without deviating from the teachings disclosed herein. In the depicted embodiment, a measurement $\alpha$ represents a distance from the fixed point on vehicle 100 to a fixed point on road sign 207. In the depicted embodiment, a measurement $\beta$ represents a distance from the fixed point on vehicle 100 to a fixed point on the other vehicle 209.

In determining whether a radar sensor 103 is longitudinally misaligned, vehicle processor 101 may take measurements of $\alpha$ and $\beta$ using both the radar sensor 103 and motion sensor 107 and compare the measurements obtained from each of the sensors to generate alignment data indicating a. If the measurements match within a predetermined threshold, it may be understood that radar sensor 103 is not misaligned within specified parameters, and alignment data may be generating indicating that radar sensor 103 is not misaligned. If the measurements are different by a value larger than a predetermined threshold, it may be understood that the radar sensor 103 may be misaligned, and alignment data may be generated indicating that radar sensor 103 is misaligned. Repeated or redundant measurements may be utilized to see if consistency is achieved in the measurement differences. If repeated measurement comparisons yield consistent differences above the predetermined threshold, it may be more likely that the radar sensor 103 is misaligned. In some embodiments, vehicle processor 101 may be operable to perform a software realignment of a radar sensor 103 based upon comparison to reference measurements of another sensor associated with vehicle 100.

In some embodiments, position sensor 111 (see FIG. 1) may be utilized as a reference sensor to assess whether another sensor, such as a radar sensor 103 may be misaligned. In such embodiments, vehicle processor 101 (see FIG. 1) may utilize one or more radar measurements to generate radar measurements that may be compared to high-density radar map data stored in memory 109 (see FIG. 1) to generate radar-position data indicating a location of vehicle 100. This radar-position data may be compared to measurements of the position sensor 111 to determine how closely the measurements match the values of the radar-position data. If the radar-position data matches the position data used to within a predetermined threshold value, it may be understood that radar sensor 103 is not misaligned within specified parameters, and alignment data may be generated indicating that radar sensor 103 is not misaligned. If the measurements are different by a value larger than a predetermined threshold, it may be understood that the radar sensor 103 may be misaligned, and alignment data may be generated indicating that radar sensor 103 is misaligned. Repeated or redundant measurements may be utilized to see if consistency is achieved in the measurement differences. If repeated measurement comparisons yield consistent differences above the predetermined threshold, it may be more likely that the radar sensor 103 is misaligned. In some embodiments, vehicle processor 101 may be operable to perform a software realignment of a radar sensor 103 based upon comparison to reference measurements of another sensor associated with vehicle 100. In some embodiments, vehicle processor 101 may be operable to generate radar-position confidence data indicating a level of confidence for the values of the radar-position data when compared to the high-density radar map data. Higher levels of radar-position confidence data may be generated in response to a high consistency of alignment found between radar sensor 103 and a reference sensor, or if radar-sensor data comprises very high confidence levels associated therewith.

In some embodiments, one or more sensors may be operable to generate confidence data indicating a confidence level in the accuracy of the measurements. In the depicted embodiment, radar sensor 103 may generate radar-sensor confidence data, optical sensor 105 may generate optical-sensor confidence data, motion sensor 107 may generate motion-sensor confidence data, and position sensor 111 may generate position-sensor confidence data. Vehicle processor 101 may be operable to utilize the associated confidence data of a sensor during the misalignment analysis. For example, if radar sensor 103 is being compared to optical sensor 105, but the optical-sensor confidence data indicates a lower confidence than that of the radar-sensor confidence data, vehicle processor 101 may not indicate that radar sensor 103 is misaligned without additional measurements. In some embodiments, the confidence data values may affect the degree of misalignment being detected without deviating from the teachings disclosed herein.

In some embodiments, if a sensor is deemed to be misaligned, vehicle processor 101 (see FIG. 1) may write log data indicating the misalignment condition to a database, such as memory 109 (see FIG. 1). Log data may provide users, drivers, or technicians with information regarding the condition of the sensors useful in completing maintenance or repairs. In some embodiments, if a sensor is deemed to be misaligned, a vehicle 100 (see FIG. 1) may initiate assisted driving or autonomous driving functions to safely remove the vehicle from active traffic, or direct a driver to a service station for maintenance or repairs. In some embodiments, if a sensor is deemed to be misaligned, a vehicle 100 may provide a visual, auditory, haptic, or other indication to a user, technician, or driver of the vehicle 100 that maintenance or repair to correct the misalignment is required. Other embodiments may comprise other responses to determination of a sensor misalignment without deviating from the teachings disclosed herein.

Figure 3:
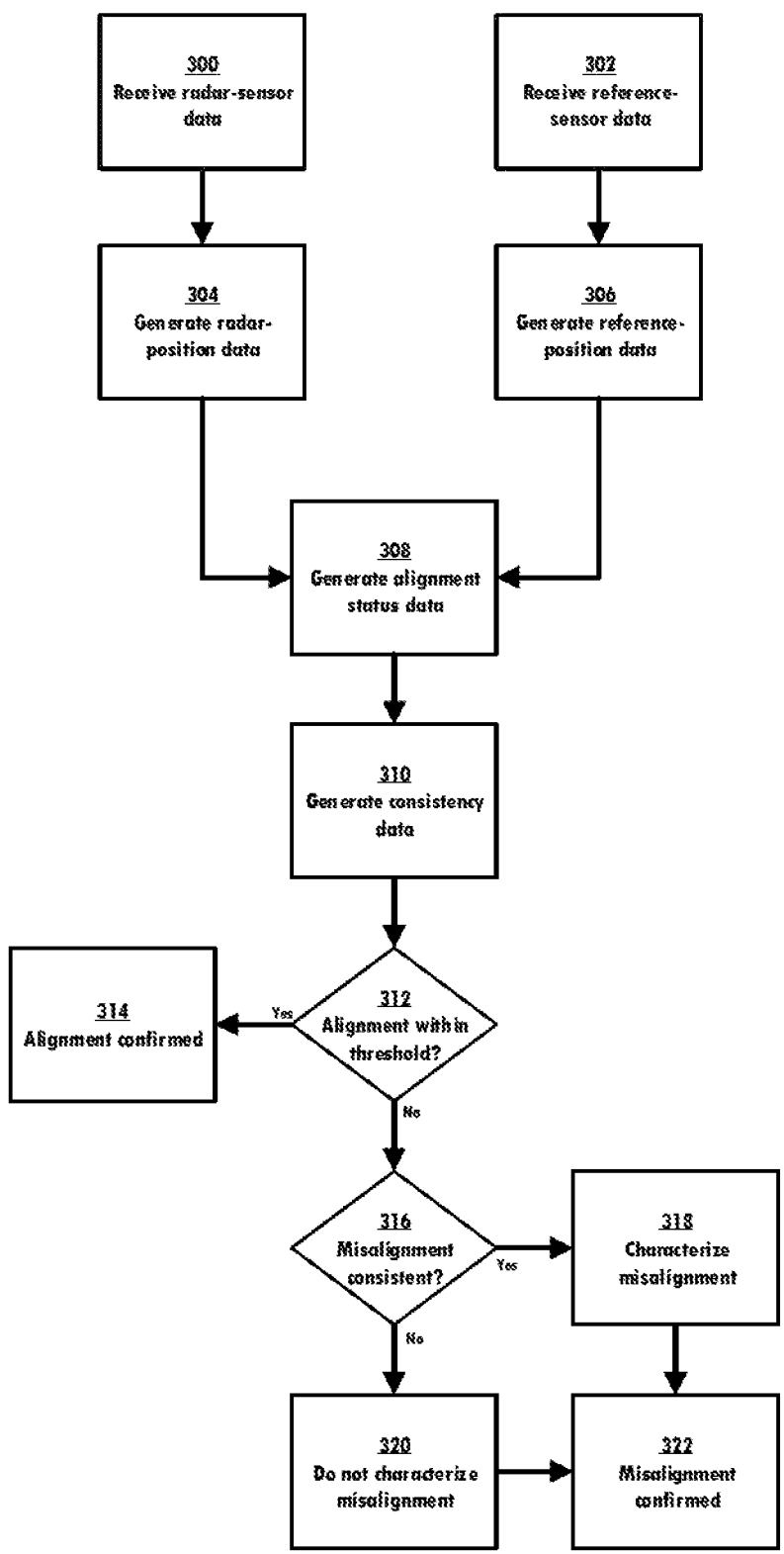
FIG. 3 is a flowchart of a method of detecting and characterizing misalignment of a radar sensor associated with a vehicle.

FIG. 3 is a flowchart of a method for characterizing the degree of misalignment of a radar sensor associated with a vehicle. The method begins at step 300 by receiving radar-sensor data from the subject radar sensor. At a substantially concurrent time, reference-sensor data may be received at step 302 from a reference sensor to which the subject radar sensor's performance will be compared. After receiving each set of data, the method continues to generate radar-position data indicating a position of the vehicle based upon the radar-sensor data in step 304. At step 306, reference-position data indicating a position of the vehicle based upon the reference-sensor data is generated. In the depicted embodiment, step 304 and step 306 may be completed in a substantially concurrent fashion, but other embodiments may complete step 304 and step 306 in any order without deviating from the teachings disclosed herein.

After radar-position data and reference-position data are each generated, the method proceeds to step 308, where the radar-position data and reference-position data are compared to generate alignment status data indicating a degree of alignment of the radar sensor and the reference sensor. At step 310, the value of the alignment status data may be compared to past values of the alignment status data to generate consistency data indicating a degree of consistency of the current alignment status data with past values thereof.

At step 312, the alignment status data is analyzed to determine whether the alignment of the radar sensor and the reference sensor is within a specified threshold value. If the alignment of the sensors is within the specified threshold, the method proceeds to step 314, where an alignment indication is generated indicating that the sensors are deemed to be in suitable alignment for operation and the method ends.

If the sensors are not determined to be aligned within a specified threshold, the sensors are deemed to be in misalignment and the method proceeds to step 316. At step 316, the consistency data is analyzed to determine whether the misalignment results comprise a consistent historical trend with past values of the alignment status data. If the misalignment is consistent with past alignment status data results, the method proceeds to step 318 where an alignment indication may be generated to characterize the misalignment according to the alignment status data and the method ends at step 322. If the misalignment is not consistent with past alignment status data results, the method proceeds to step 320, where the misalignment is noted, but is not characterized according to the alignment status data, and the method ends at step 322.

In some embodiments, the steps directed to determining consistency of alignment status or characterizing a misalignment may be omitted without deviating from the teachings disclosed herein. Some embodiments may omit one or more of steps 310, 316, 318, or 320 without deviating from the teachings disclosed herein.

The method may be completed utilizing a processor executing instructions stored upon a non-transitory computer-readable medium. The processor may be embodied as a vehicle processor, a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art. Computer-executable instructions may include instructions and data which cause a general purpose computer, special purpose computer, or special purpose processing device to perform a certain function or group of functions. Computer-executable instructions may also include program modules that are executed by computers in stand-alone or network environments. Program modules may include routines, programs, objects, components, or data structures that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:
1. A vehicle sensor system comprising:
    a vehicle processor disposed at least in part within a predetermined distance of the body of the vehicle;
    a radar sensor in data communication with the vehicle processor and disposed within a predetermined distance of the vehicle processor;
    a reference sensor in data communication with the vehicle processor and disposed within a predetermined distance of the vehicle processor; and
    a memory in data communication with the vehicle processor and storing a high-density radar-sensor map and at least one high-density reference-sensor map,
    wherein the vehicle processor is operable to receive radar-sensor data from the radar sensor and generate radar-position data indicating a location of the vehicle, the vehicle processor is further operable to receive reference-sensor data from the reference sensor and generate reference-position data indicating a lane localization of the vehicle, and the vehicle processor is further operable to generate alignment data indicating the alignment status of the radar sensor and whether the alignment status is within a predetermined threshold based upon a comparison of the radar-position data and the reference-position data.

2. The system of claim 1, wherein the reference sensor comprises an optical sensor.

3. The system of claim 1, wherein the reference sensor comprises a motion sensor.

4. The system of claim 1, wherein:
the reference sensor is a first reference sensor,
the system further comprises a second reference sensor disposed within a predetermined distance of the vehicle processor, the second reference sensor is in data communication with the vehicle processor,
the second reference sensor is operable to generate second reference and
the vehicle processor is further operable to generate second reference-position data and generate alignment data based upon a comparison of the radar-position data and the second reference-position data in view of a predetermined threshold.

5. The system of claim 4, wherein the first reference sensor comprises a radar sensor and the second reference sensor comprises a motion sensor.

6. The system of claim 1, wherein the vehicle processor is further configured to generate a radar-position confidence indicating a confidence level of the location indicated by the radar-position data and a reference-position confidence indicating a confidence level of the location indicated by the reference-position data.

7. A method of detecting misalignment of a radar sensor associated with a vehicle, the method comprising:
generating radar-position data using the radar sensor, the radar-position data indicating a location of the vehicle with respect to the environment;
generating reference-position data using at least one reference sensor, the reference-position data indicating a location of the vehicle with respect to the environment;
generating alignment status data indicating whether the radar-position data matches the reference-position data within a threshold value; and
generating an alignment indication when the alignment status data does not indicate that the radar-position data matches the reference-position data within the threshold value, wherein
the radar-position data is generated using high-density radar-sensor map data indicating environmental features detectable by the radar sensor and the reference-position data is generated using high-density reference-sensor map data indicating environmental features detectable by the reference sensor.

8. The method of claim 7, wherein the at least one reference sensor comprises an optical sensor.

9. The method of claim 8, wherein the at least one reference sensor further comprises a motion sensor different from the optical sensor.

10. The method of claim 7, further comprising updating the alignment status data in response to a change in the value of the radar-position data or the reference-position data, and generating consistency data indicating a consistent historical trend of the alignment status data.

11. The method of claim 10, further comprising adjusting the alignment indication based upon the value of the consistency data.

12. A non-transitory computer-readable medium comprising instructions stored thereon that when executed by a processor cause the processor to perform the steps of:
receiving radar-sensor data from a radar sensor associated with a vehicle;
generating radar-position data based upon the radar-sensor data, the radar-position data indicating a location of the vehicle with respect to an environment in which the vehicle is disposed;
receiving reference-sensor data from at least one reference sensor associated with the vehicle;
generating reference-position data based upon the reference-sensor data, the reference-position data indicating a location of the vehicle with respect to the environment;
generating alignment status data indicating whether the radar-position data matches the reference-position data within a threshold value; and
generating an alignment indication when the alignment status data does not indicate that the radar-position data matches the reference-position data within the threshold value, wherein
the radar-position data is generated using high-density radar-sensor map data indicating environmental features detectable by the radar sensor and the reference-position data is generated using high-density reference-sensor map data indicating environmental features detectable by the reference sensor.

13. The non-transitory computer-readable medium of claim 12, wherein the at least one reference sensor comprises a first reference sensor and a second reference sensor and wherein the reference-sensor data comprises first reference-sensor data generated by the first reference sensor and second reference-sensor data generated by the second reference sensor.

14. The non-transitory computer-readable medium of claim 13, wherein the first reference sensor comprises an optical sensor and the first reference-sensor data comprises optical-sensor data.

15. The non-transitory computer-readable medium of claim 14, wherein the second sensor comprises a motion sensor and the second reference-sensor data comprises motion-sensor data.

* * * * *